(12) United States Patent  (10) Patent No.: US 8,910,997 B2
Featherman et al.  (45) Date of Patent: Dec. 16, 2014

(54) ADJUSTABLE AUTOMOBILE SHADE COVER

(71) Applicants: Bernard Featherman, Highland Beach, FL (US); Daniel Featherman, Highland Beach, FL (US)

(72) Inventors: Bernard Featherman, Highland Beach, FL (US); Daniel Featherman, Highland Beach, FL (US)

( * ) Notice: Subject to any disclaimer, the term of this patent is extended or adjusted under 35 U.S.C. 154(b) by 0 days.

(21) Appl. No.: 14/210,914

(22) Filed: Mar. 14, 2014

(65) Prior Publication Data

US 2014/0265427 A1 Sep. 18, 2014

Related U.S. Application Data

(60) Provisional application No. 61/791,753, filed on Mar. 15, 2013.

(51) Int. Cl.
*B60J 11/00* (2006.01)
*B60J 11/04* (2006.01)

(52) U.S. Cl.
CPC ...................................... *B60J 11/04* (2013.01)
USPC .................. 296/136.07; 296/136.13; 150/166

(58) Field of Classification Search
CPC ................................ B60J 11/00; B60J 11/04
USPC .................. 296/98, 136.07, 136.13; 280/770; 150/166
See application file for complete search history.

(56) References Cited

U.S. PATENT DOCUMENTS

| 2,950,749 | A | * | 8/1960 | MacDonald | 150/166 |
|---|---|---|---|---|---|
| 4,355,839 | A | * | 10/1982 | Rosen | 150/166 |
| 4,596,418 | A | * | 6/1986 | Koh | 296/136.04 |
| 4,925,234 | A | * | 5/1990 | Park et al. | 296/136.13 |
| 4,951,993 | A | * | 8/1990 | Taboada | 296/136.13 |
| 5,029,933 | A | * | 7/1991 | Gillem | 296/136.11 |
| 5,188,417 | A | | 2/1993 | Curchod | |
| 5,328,230 | A | | 7/1994 | Curchod | |
| 5,429,406 | A | * | 7/1995 | Huang | 296/95.1 |
| 5,435,362 | A | * | 7/1995 | Chiang | 150/166 |
| D393,828 | S | * | 4/1998 | Threats, Sr. | D12/401 |
| 6,513,858 | B1 | | 2/2003 | Li et al. | |
| 6,682,123 | B2 | * | 1/2004 | Burks et al. | 296/98 |
| 6,981,509 | B2 | * | 1/2006 | Sharapov | 135/88.11 |
| 7,093,878 | B1 | * | 8/2006 | Fontanilla | 296/95.1 |
| 7,159,631 | B2 | * | 1/2007 | Yang | 150/166 |
| 7,290,826 | B2 | * | 11/2007 | Dempsey | 296/136.13 |
| 2004/0238089 | A1 | * | 12/2004 | Li et al. | 150/166 |
| 2005/0217772 | A1 | * | 10/2005 | Allen | 150/166 |
| 2009/0102230 | A1 | * | 4/2009 | Pehrson | 296/136.13 |
| 2013/0300149 | A1 | | 11/2013 | Dao | |

* cited by examiner

*Primary Examiner* — Lori Lyjak
(74) *Attorney, Agent, or Firm* — Jon Fallon, Esq.; Michael P. Kochka, Esq.

(57) ABSTRACT

An adjustable automobile shade cover and a method for covering the windows of a vehicle are disclosed. The shade cover includes a flexible and collapsible shade panel covering the windshield, the window and passenger compartment of the vehicle to provide temporary shading from the sun and other weather elements, and is adjustably anchored to the closed trunk on one end of the shade panel, and to a front or side area of the vehicle on the other end of the shade panel.

7 Claims, 4 Drawing Sheets

ADJUSTABLE AUTOMOBILE SHADE COVER

PRIORITY CLAIM

The present application claims the benefit of U.S. Provisional Patent Application No. 61/791,753, which was filed on Mar. 15, 2013.

FIELD OF THE INVENTION

The present invention generally relates to the weather shielding devices and, more particularly, to a collapsible, flexible shade cover that is adjustably and detachably attached to a vehicle. In some embodiments of the invention, the shade cover extends from the hinged end of the trunk, to the front area or the side area of the parked vehicle such as the wheel, wheel fender or wheel fender well of a parked vehicle. In some embodiments, the shade cover is anchored by a rear connection component secured inside the closed trunk. The shade covers the exterior of the rear window, over the roof, the front windshield, and, optionally, the side windows to shield and reflect sun rays away from vehicle.

BACKGROUND

In general, the temperature inside the passenger compartment of a vehicle rises to an uncomfortable level when it is parked in the sun on a hot summer day. It is beneficial to cover the windows of the vehicle with a light reflective cover to shield the windows from sun light to lower the temperature inside the passenger compartment.

Some vehicle owners use a portable fold-up shade that is placed in the interior of the front windshield above the dashboard to reflect sunlight from the windshield. This type of portable fold-up shade does not provide any shielding to sun light entering from the other windows in the passenger compartment. Sun light still streams into the automobile and increases the interior temperature inside the automobile.

Some vehicle owners use automobile covers mainly for long term weather storage, which does not prevent heat build-up inside the automobile. This type of automobile cover is usually tailored specifically to fit a particular model of an automobile, and is not easily adjustable. Such covers are usually heavy and bulky, and take up valuable space in the trunk. It takes time to set up and put the cover on the automobile, which makes it not ideal for providing temporary shading from the sun when the automobile is parked outside for a short period of time.

There is, therefore, a need for a flexible and collapsible shade cover which is adjustable to accommodate different vehicle types, makes and models.

There is a further need for a flexible and collapsible shade cover which is portable such that it can be stored in the trunk of the automobile for easy transportation and storage.

There is a still further need for a flexible and collapsible shade cover that is easy to attach and detach for assembly and disassembly to provide temporary shading when the user's vehicle is out in the sun.

There is yet a further need for a flexible and collapsible shade cover that is simple and economical to manufacture.

SUMMARY OF INVENTION

The present invention is an adjustable automobile shade cover that includes a flexible shade panel that covers the windshield and the windows of the passenger compartment of the automobile to provide temporary shading from the sun and other weather conditions, and is adjustably anchored to the hinged end of the closed trunk on one end of the shade panel using a flexible cord and weights, and is adjustably anchored to the front area or the side area of the vehicle, such as the wheels, wheel fenders or wheel fender wells, on the other end of the shade panel using a flexible and extendable cord with a fastener detachably attached thereto.

The adjustable automobile shade cover can be adjusted to fit different models and types of vehicles by adjusting the length of the flexible and extendable cords attached to the two ends of the shade panel.

The adjustable automobile shade cover is put on by hand, over the parked automobile. It can be collapsed and removed by the driver when the automobile is driven elsewhere. It can be stored in a compact form in the car trunk in transit, which does not take up valuable trunk space.

The cover shields the windshield and windows of the vehicle in order to reflect sun's beating rays away from the automobile to prevent heat building up inside the automobile when it is parked in the sun, and reduce the internal temperature in the passenger compartment.

In the preferred embodiment of the invention, the adjustable automobile shade cover comprises a shade panel that extends from the roof of the automobile, in all four sides to cover the back window, the front wind shield, and extends past the bottom edge of the side windows of the passenger compartment.

DESCRIPTION OF THE INVENTION

Figure 1:
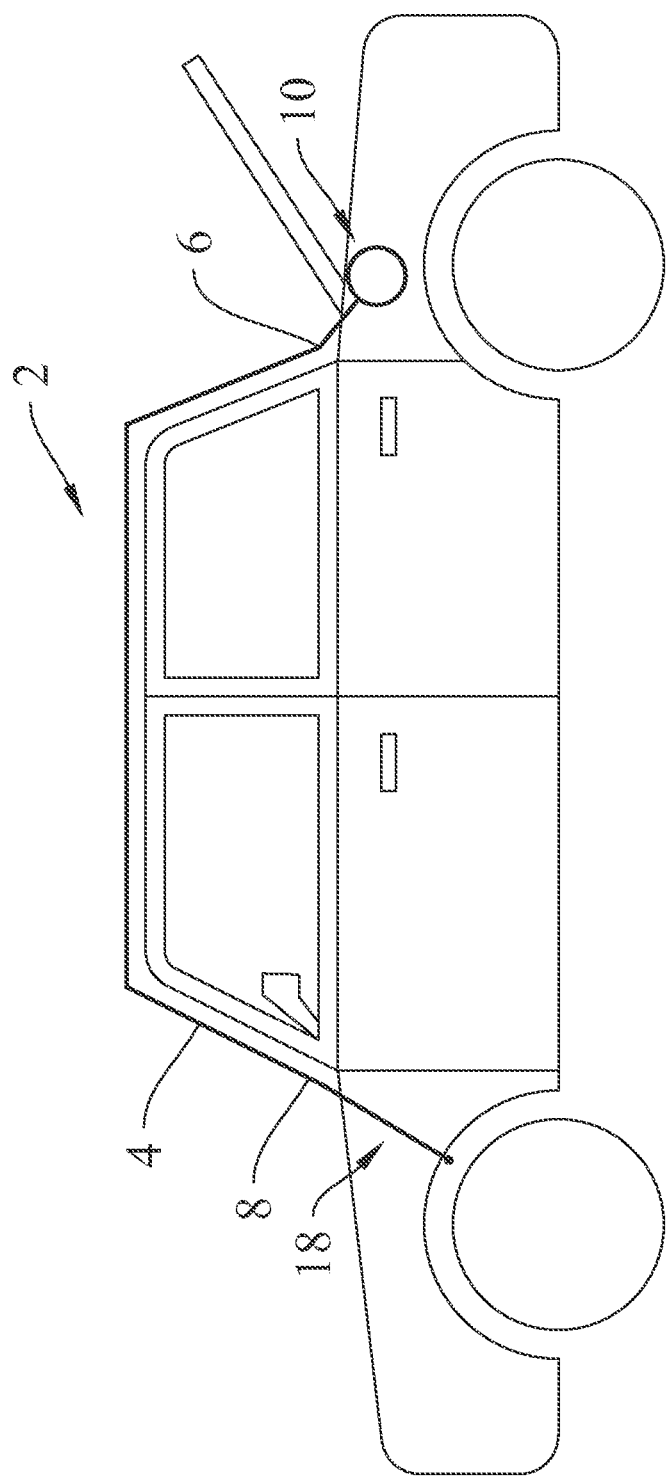
FIG. 1 is a drawing of the side view of the adjustable automobile shade of an embodiment of the invention.

FIG. 1 shows an exemplary embodiment of the adjustable automobile shade cover 2. The adjustable automobile shade cover 2 comprises a flexible shade panel 4 having a back distal end 6 and a front distal end 8, a plurality of rear connection components 10 attaching the back distal end 6 of the shade panel 4 to the hinged end of a closed trunk of a vehicle, and a plurality of anchors 18 attaching to the front distal end 8 of the shade panel 4 to the front area or side area of the vehicle, such as the wheels, the wheel fenders, or wheel fender wells of the vehicle. In an alternative embodiment, the back distal end 6 of the shade panel 4 is attached to the rear wheel, rear fender or rear fender wells of the vehicle via a plurality of anchors, in lieu of the rear connection components 10 depicted in FIG. 1.

Figure 2:
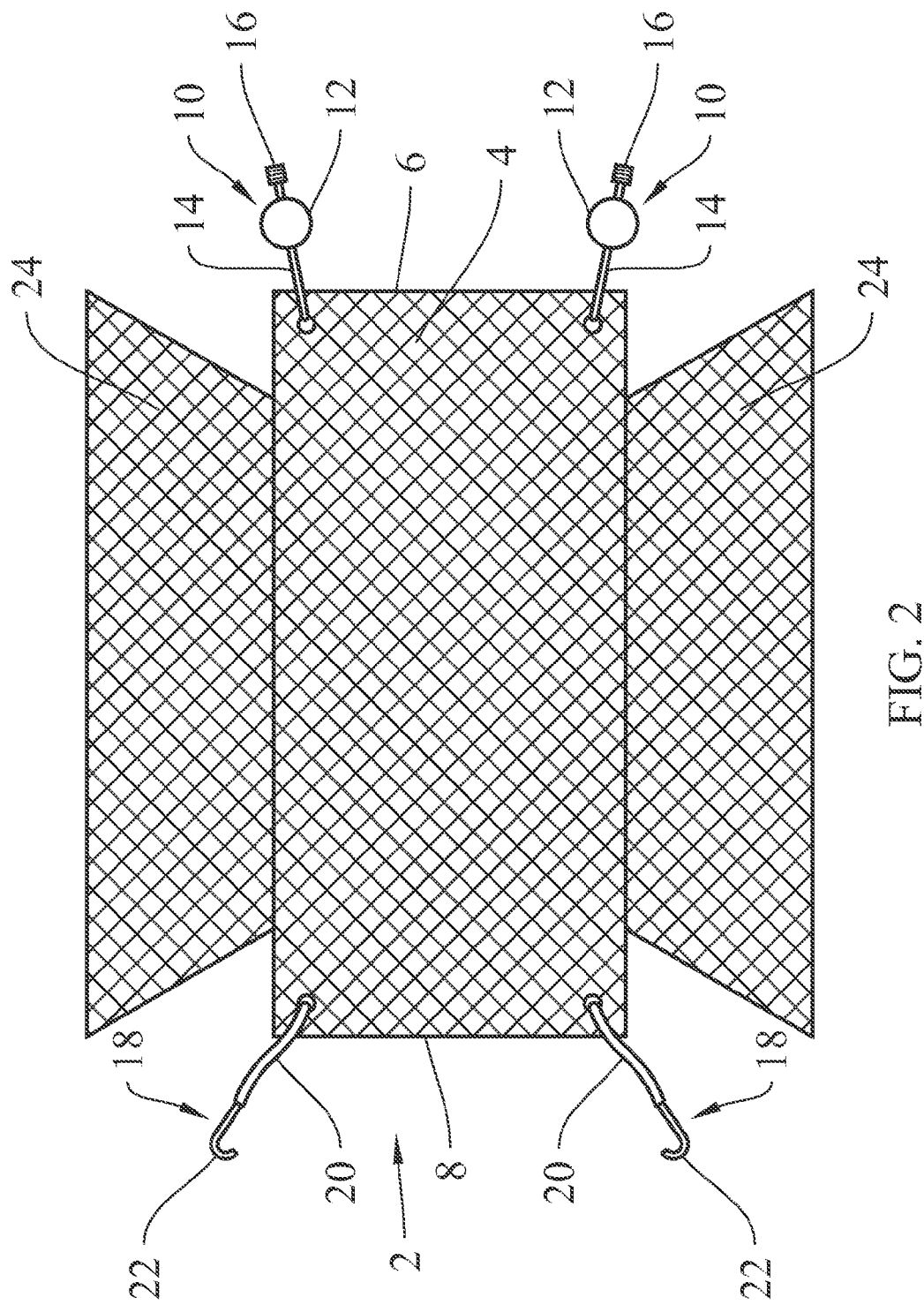
FIG. 2 is a drawing of the top view of the adjustable automobile shade of an embodiment of the invention.

FIG. 2 shows the top view of an embodiment of the invention, the rear connection components 10 each comprising a back cord 14 attached to the back distal end 6 of the shade panel 4, a weight 12 connected to an adjustable stopper 16 by the back cord 14. The weight 12 can be of any shape and size. In the preferred embodiment of the invention, the weight 12 is a rubber ball of approximately 1-3" in diameter. In alternate embodiments, the rear connection component 10 comprises a back cord 14 and a weight 12. In further embodiments, the rear connection component 10 comprises a back cord 14 and an adjustable stopper 16. In still further embodiments, the rear connection component comprises a hook, latch, tie, or any other mechanism that is suitable for securing the back distal end 6 of the shade panel 4 and that is capable of being placed under the hinged end of a closed trunk of a vehicle.

In the embodiment depicted in FIG. 2, to anchor the back distal end 6 of the shade panel 4 over the back window, while the trunk of the vehicle is in an open position, the weight 12 is placed into the trunk while the back cord 14 extends from the weight 12 through the hinged end of the trunk to the back distal end 6 of the shade panel 4 positioned over the back window. The position of the weight 12 is adjustable up or down on the back cord 14, and locked into place by the lockable stopper 16 to hold the shade panel 4 tight over the top of the automobile after the trunk is closed. When the trunk is closed, the weight 12 is locked into the car trunk to secure the back distal end 6 of the shade panel 4 over the back window.

The back cord 14 can be made of any material and thickness. In the preferred embodiment, the back cord 14 is made of nylon.

The shade panel 4 can be made of a variety of flexible materials, including, but not limited to cloth, TYVEK, nylon, plastic, natural fibers, metallized fibers, a combination of any of the above. To reduce heat from building up inside the vehicle, the material of the shade panel 4 is preferred to be a flexible material that is heat resistant and reflective of light. In the preferred embodiment, the shade panel is made of metallized TYVEK that reflects sun rays and is collapsible.

In the embodiment depicted in FIG. 2, the anchor 18 comprises of a front cord 20 attached to the front distal end 8 of the shade panel 4, a hook 22 attached to the other end of the front cord 20. The hook 22 is capable of being removably attached to the front wheel fender well of the vehicle to hold the front end of the shade panel 4 securely over the top of the vehicle. The front cord 20 can be made of any material and thickness and is adjustable in length. In the preferred embodiment, the front cord 20 is a flat bungee cord that is extendable and adjustable in length, and the hook 22 is preferably made of plastic such that the finish of the wheel fender well will not be scratched or harmed.

To secure the front distal end 8 of the shade panel 4, the user attaches the hook 22 to the front wheel fender well of the vehicle to hold the front end of the shade panel 4 securely over the top of the vehicle. In a further embodiment of the invention, the hook 22 includes a lock or a mechanism to detachably attach to the wheel fender well.

Figure 3:
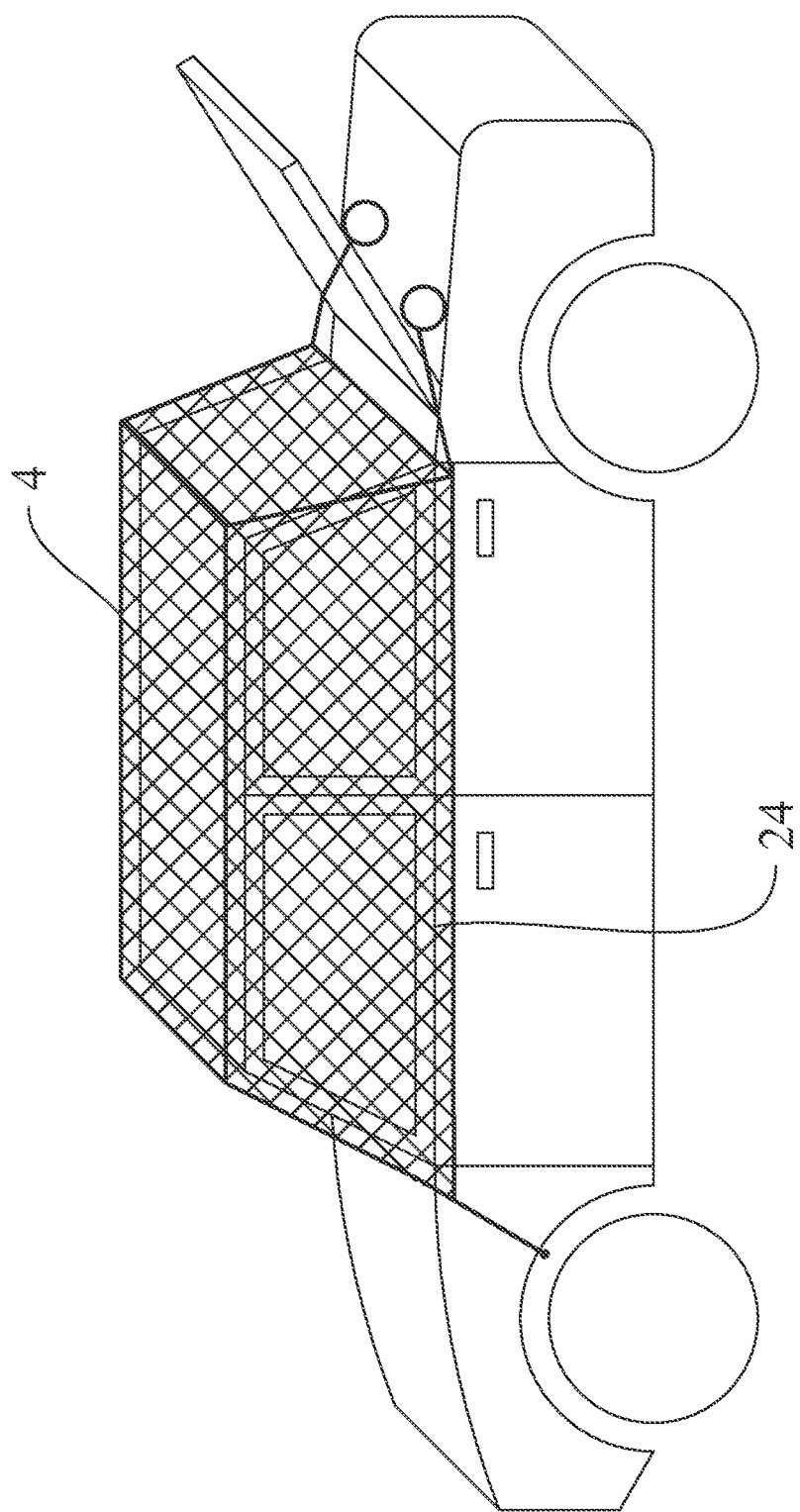
FIG. 3 is a perspective drawing of the adjustable automobile shade of an embodiment of the invention.

FIG. 3 shows a perspective view of an embodiment of the invention. The shade panel 4 extends from the exterior of the vehicle at the hinged edge of the trunk past the exterior of the rear window, over the roof and past the exterior of the front windshield of the automobile. FIG. 3 depicts an embodiment in which the shade panel 4 has two side portions 24 extending from the central portion of the shade panel 4 to the bottom of the side windows.

Figure 4:
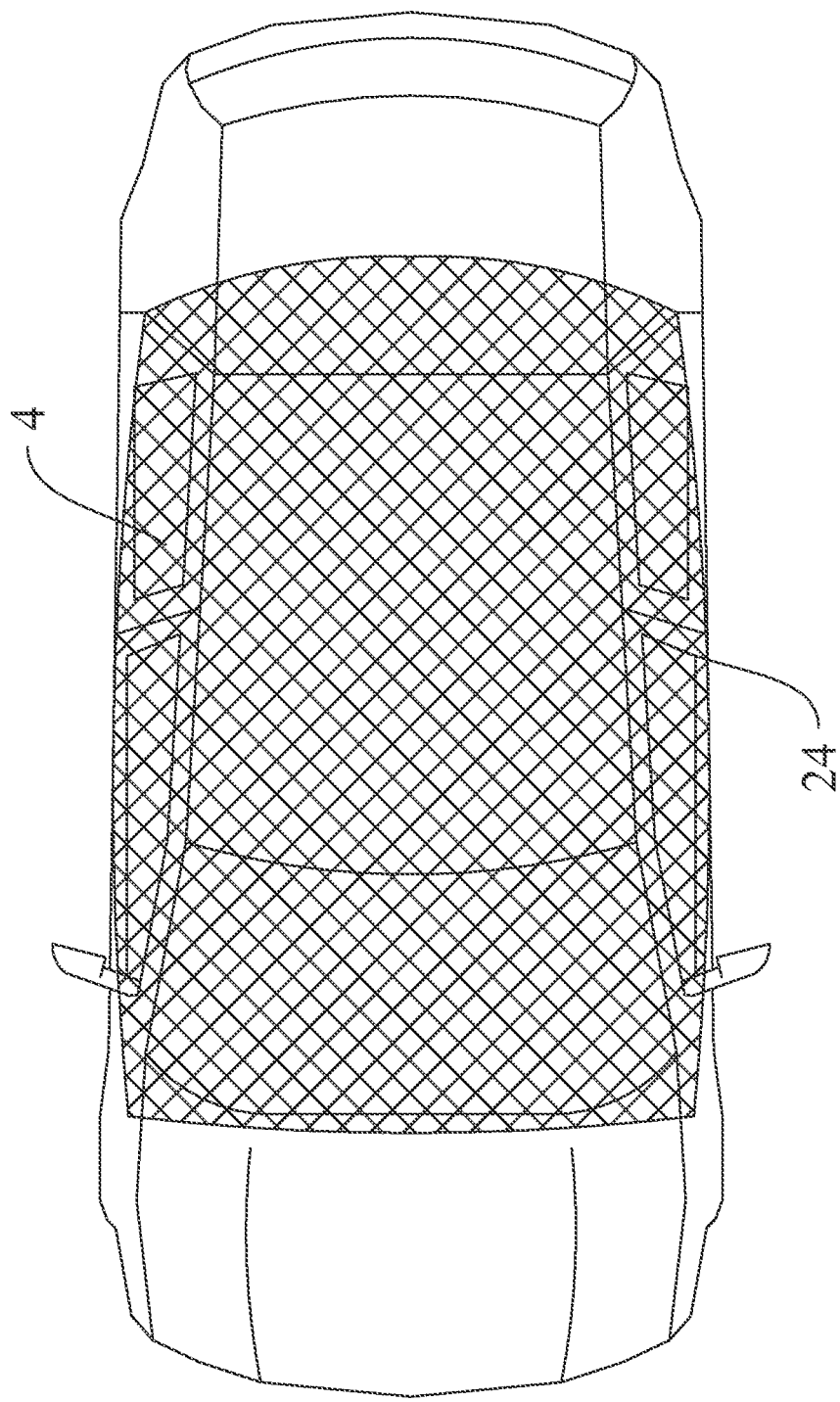
FIG. 4 is a drawing of the top view of the adjustable automobile shade of an embodiment of the invention.

FIG. 4 depicts a top view of an embodiment of the invention showing the front distal end 8, back distal end 6, and side ends 24 of the shade panel 4.

In an embodiment of the invention, one could cover the side windows of the passenger compartment after the front and back distal ends 6, 8 of the shade panel 4 are anchored to the vehicle by rolling down the side ends 24 of the shade panel 4 from the central portion of the shade panel 4. In a further embodiment, weights are attached to or included within the side ends 24 to prevent gusts of wind from displacing the extended side ends.

In an embodiment of the invention, to remove the adjustable automobile shade cover 2, the user first unhooks the anchors 18 by disengaging the hooks 22 from the front or side area of the vehicle such as the wheels, wheel fenders or wheel fender wells, unfolds the sides 24 of the shade panel 4 upward from the side windows and onto the roof of the vehicle, folds the front cords 20 and hooks 22 over the front distal end 8 of the shade panel 4 and begins rolling it toward the rear of the vehicle until the hinged edge of the trunk, then opens the trunk and remove the weights 12, and folds the shade panel 4 and weights such that they fit into the trunk.

What is claimed is:

1. A vehicle shade cover comprising:
   a flexible shade panel capable of extending over the roof of a vehicle, said shade panel having a back distal end extending to the hinged edge of a trunk of the vehicle and a front distal end extending past the lower edge of the windshield;
   a plurality of rear connection components attached to the back distal end of the flexible shade panel, wherein at least a portion of each rear connection component is positioned inside the trunk, and wherein said rear connection components are capable of securing the shade panel to the vehicle when the trunk is closed; and
   a plurality of anchors each having a first end and a second end, wherein the first is attached to the front distal end of the flexible shade panel, and wherein the second end is capable of being removably attached to a front or side area of the vehicle;
   wherein at least one of the plurality of anchors comprises a hook connected by a flexible and extendable cord to the front distal end of the flexible shade panel;
   wherein at least one of the plurality of rear connection components further comprises a weight adjustably attached to the back distal end of the flexible shade panel by a flexible and extendable cord and a stopper; and
   wherein the flexible shade panel further comprises two side portions capable of extending to cover the side windows of the passenger compartment of the vehicle.

2. The vehicle shade cover of claim 1, wherein at least one of the rear connection components further comprises a weight adjustably attached to the back distal end of the flexible shade panel by a flexible and extendable cord.

3. The vehicle shade cover of claim 1, wherein at least one of the rear connection components further comprises a weight adjustably attached to the back distal end of the flexible shade panel by a flexible and extendable cord and a stopper.

4. The vehicle shade cover of claim 1, wherein at least one of the rear connection components further comprises a stopper adjustably attached to the back distal end of the flexible shade panel by a flexible and extendable cord.

5. The vehicle shade cover of claim 3, wherein the flexible shade panel further comprises two side portions capable of extending to cover the side windows of the passenger compartment of the vehicle.

6. The vehicle shade cover of claim 5, wherein the side portions are sufficiently weighted to prevent wind from displacing the side portions when extended.

7. The vehicle shade cover of claim 1, wherein the side portions are sufficiently weighted to prevent wind from displacing the side portions when extended.

* * * * *